US012520138B2

(12) United States Patent
Sikes

(10) Patent No.: US 12,520,138 B2
(45) Date of Patent: Jan. 6, 2026

(54) SUBSCRIBER IDENTITY MODULE-BASED AUTHENTICATION FOR MOBILE APPLICATIONS

(71) Applicant: AT&T Intellectual Property I, L.P., Atlanta, GA (US)

(72) Inventor: Jason Sikes, Carnation, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 480 days.

(21) Appl. No.: 18/189,699

(22) Filed: Mar. 24, 2023

(65) Prior Publication Data

US 2024/0323681 A1   Sep. 26, 2024

(51) Int. Cl.
*G06F 21/00* (2013.01)
*H04W 12/0431* (2021.01)
*H04W 12/06* (2021.01)
*H04W 12/72* (2021.01)

(52) U.S. Cl.
CPC ....... *H04W 12/06* (2013.01); *H04W 12/0431* (2021.01); *H04W 12/72* (2021.01)

(58) Field of Classification Search
CPC . H04W 12/06; H04W 12/0431; H04W 12/72; H04W 12/069
See application file for complete search history.

(56) References Cited

U.S. PATENT DOCUMENTS

| 11,234,132 | B1* | 1/2022 | Sicard | H04W 12/72 |
| 2012/0149334 | A1* | 6/2012 | Zhang | H04W 12/068 455/411 |
| 2012/0264402 | A1* | 10/2012 | Zhang | H04W 12/069 455/411 |
| 2016/0087972 | A1* | 3/2016 | Ahmavaara | H04W 12/043 726/10 |
| 2017/0323116 | A1* | 11/2017 | Mumford | H04L 9/3226 |
| 2020/0045541 | A1* | 2/2020 | Kreishan | H04W 12/06 |
| 2021/0120409 | A1* | 4/2021 | Nair | H04L 9/0844 |
| 2022/0248224 | A1* | 8/2022 | Verma | H04W 12/40 |
| 2023/0319564 | A1* | 10/2023 | Mohammed | H04W 12/069 455/410 |
| 2024/0381086 | A1* | 11/2024 | Stammers | H04W 12/08 |

OTHER PUBLICATIONS

"A Comparative Introduction to 4G and 5G Authentication," Informed Insights, CableLabs, 2019, https://www.cablelabs.com/insights/a-comparative-introduction-to-4g-and-5g-authentication.

(Continued)

*Primary Examiner* — Kendall Dolly

(57) ABSTRACT

An operating system provided by a processing system including at least one processor of a cellular endpoint device may obtain an authentication request from an application of a third party application provider and may transmit an entitlement request to a cellular network in accordance with a subscriber identity module-based authentication message exchange, in response to the authentication request. The operating system may then obtain an authorization indicator from the cellular network, in accordance with the subscriber identity module-based authentication message exchange, and may provide an authentication confirmation to the application in response to the obtaining of the authorization indicator.

20 Claims, 5 Drawing Sheets

(56) References Cited

OTHER PUBLICATIONS

Gavin, Brady, "What Is a Sim Card (and What Comes Next)?" How-To-Geek, Jun. 1, 2018, https://www.howtogeek.com/353634/what-is-a-sim-card/.

"5G Security," ITU-APT Foundation of India—5G Tech Sessions, Samsung R&D, Bengaluru, Sep. 27, 2018, 24 pages, https://www.itu-apt.org/28-GHz-Indiay-5G-Spectrum-Workshop/docs/narendra.pdf.

* cited by examiner

SUBSCRIBER IDENTITY MODULE-BASED AUTHENTICATION FOR MOBILE APPLICATIONS

The present disclosure relates generally to cellular networks, and more particularly to methods, non-transitory computer-readable media, and apparatuses for an operating system of a cellular endpoint device to provide an authentication confirmation to an application in response to an authorization indicator obtained from a cellular network in accordance with a subscriber identity module-based authentication message exchange. The present disclosure also relates to methods, non-transitory computer-readable media, and apparatuses for transmitting an authorization indicator to a cellular endpoint device in accordance with a subscriber identity module-based authentication message exchange in response to determining an entitlement of the cellular endpoint device to access a third party application platform associated with an application. The present disclosure further relates to methods, non-transitory computer-readable media, and apparatuses for transmitting an instruction to an application to initiate an entitlement request to a cellular network in accordance with a subscriber identity module-based authentication message exchange.

BACKGROUND

A cloud radio access network (RAN) is part of the $3^{rd}$ Generation Partnership Project (3GPP) fifth generation (5G) specifications for mobile networks. As part of the migration of cellular networks towards 5G, a cloud RAN may be coupled to an Evolved Packet Core (EPC) network until new cellular core networks are deployed in accordance with 5G specifications. For instance, a cellular network in a "non-stand alone" (NSA) mode architecture may include 5G radio access network components supported by a fourth generation (4G)/Long Term Evolution (LTE) core network (e.g., an EPC network). However, in a 5G "standalone" (SA) mode point-to-point or service-based architecture, components and functions of the EPC network may be replaced by a 5G core network.

SUMMARY

In one example, the present disclosure discloses a method, computer-readable medium, and apparatus for an operating system of a cellular endpoint device to provide an authentication confirmation to an application in response to an authorization indicator obtained from a cellular network in accordance with a subscriber identity module-based authentication message exchange. For example, an operating system provided by a processing system including at least one processor of a cellular endpoint device may obtain an authentication request from an application of a third party application provider and may transmit an entitlement request to a cellular network in accordance with a subscriber identity module-based authentication message exchange, in response to the authentication request. The operating system may then obtain an authorization indicator from the cellular network, in accordance with the subscriber identity module-based authentication message exchange, and may provide an authentication confirmation to the application in response to the obtaining of the authorization indicator.

In one example, the present disclosure also discloses a method, computer-readable medium, and apparatus for transmitting an authorization indicator to a cellular endpoint device in accordance with a subscriber identity module-based authentication message exchange in response to determining an entitlement of the cellular endpoint device to access a third party application platform associated with an application. For example, a processing system including at least one processor deployed in a cellular network may obtain an entitlement request from a cellular endpoint device in accordance with a subscriber identity module-based authentication message exchange, where the entitlement request includes a first telephone number associated with a user account, and where the user account is associated with an application operating on the cellular endpoint device. The processing system may then determine an entitlement of the cellular endpoint device to access a third party application platform associated with the application, in accordance with the first telephone number, and may transmit an authorization indicator to the cellular endpoint device in accordance with the subscriber identity module-based authentication message exchange, where the authorization indicator is to enable an access of the application operating on the cellular endpoint device to the third party application platform associated with the application.

In one example, the present disclosure further discloses a method, computer-readable medium, and apparatus for transmitting an instruction to an application to initiate an entitlement request to a cellular network in accordance with a subscriber identity module-based authentication message exchange. For example, a processing system including at least one processor of an application platform of a third party application provider may obtain a login request from an application operating on a cellular endpoint device, wherein the application is associated with the application platform, wherein the login request includes at least one user credential of a user account associated with the application. The processing system may then verify the at least one user credential in accordance with stored account data of the user account and may transmit an instruction to the application to initiate an entitlement request to a cellular network in accordance with a subscriber identity module-based authentication message exchange.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
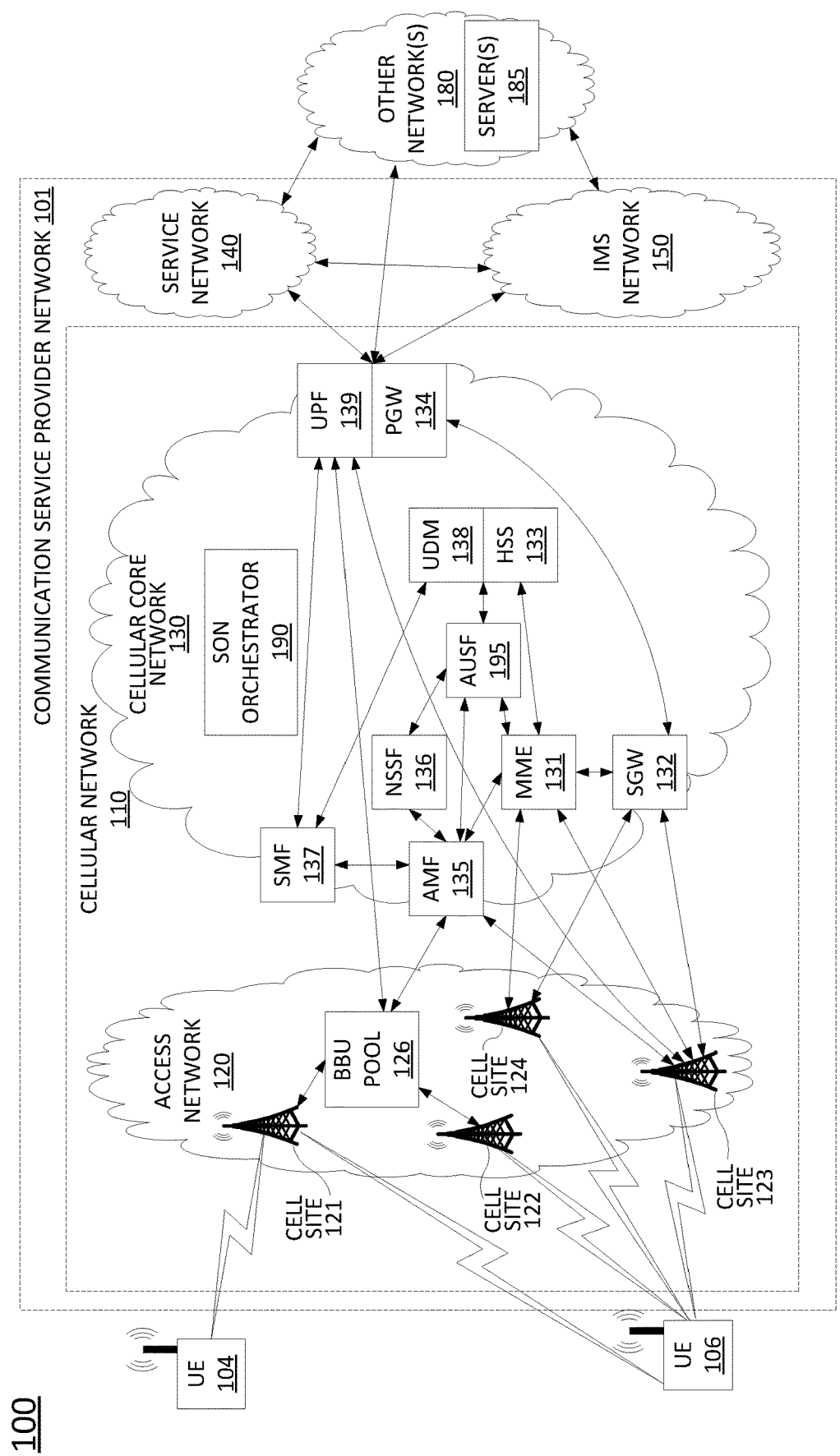
FIG. 1 illustrates a block diagram of an example system, in accordance with the present disclosure.

The present disclosure broadly discloses methods, non-transitory computer-readable media, and apparatuses for an operating system of a cellular endpoint device to provide an authentication confirmation to an application in response to an authorization indicator obtained from a cellular network in accordance with a subscriber identity module-based authentication message exchange, methods, non-transitory computer-readable media, and apparatuses for transmitting an authorization indicator to a cellular endpoint device in accordance with a subscriber identity module-based authentication message exchange in response to determining an entitlement of the cellular endpoint device to access a third party application platform associated with an application, and methods, non-transitory computer-readable media, and apparatuses for transmitting an instruction to an application to initiate an entitlement request to a cellular network in accordance with a subscriber identity module-based authentication message exchange. In particular, examples of the present disclosure describe a multi-factor authentication for mobile applications using mobile devices' operating systems and mobile network operator (MNO) infrastructure. Multi-factor authentication (MFA) is an increasingly popular method of protecting sensitive information and preventing unauthorized access to systems and services. MFA typically involves the use of two or more factors to authenticate a user's identity, such as something that the user knows (e.g., a password, an answer to a stored question, and the like) and something the user has access to (e.g., a mobile device to receive a text message with a time dependent code). A popular MFA method is short message service (SMS)/text message-based authentication, where a unique one-time code is sent to the user's mobile device via SMS after a correct username and password are provided. However, SMS-based MFA may provide a cumbersome user experience, and may have limitations in terms of security and reliability. For example, SMS messages are not always secure and may be intercepted by attackers, which can compromise the security of the MFA process. Additionally, some attackers have been known to use social engineering tactics to trick users into revealing one-time codes, which can also compromise the security of the MFA process. In addition, SMS-based MFA may be burdensome on the user to select a phone number, receive a text/SMS message with a PIN, switch to the messaging interface to retrieve the PIN, switch back to the application, and then manually enter the PIN.

Examples of the present disclosure provide a secure and reliable method of MFA that leverages the user's mobile device operating system and the infrastructure of the MNO. Examples of the present disclosure may also provide an improved user experience, such as eliminating the steps of a customer receiving an SMS-based message and typing-in a one-time PIN. MFA via mobile device entitlement with an MNO token is a highly secure and convenient method of authentication that can help to protect sensitive information and prevent identity theft and fraud. In addition, the user experience is improved as an MFA capability is enabled with no user intervention, or very minimal (easy) user action, such as zip code entry. More specifically, examples of the present disclosure provide for additional authentication (e.g., MFA) using a mobile device entitlement check via a subscriber identity module (SIM)-based authentication message exchange with the MNO. For instance, this may comprise a SIM-based extensible authentication protocol (EAP) message exchange, e.g., an EAP Authentication and Key Agreement (EAP-AKA) message exchange, or the like. In one example, the MNO provides a short-life token for positive authentication/entitlement verification. To illustrate, a user may first provide a username and password via an application of a third-party service in operation on the user's mobile endpoint device (e.g., a client application, or "application client"). The application may forward the username and password to the application service infrastructure (e.g., one or more servers hosting/providing the application). However, instead of receiving an SMS-based code for MFA, the application (e.g., the client application on the mobile endpoint device) may make a call to the operating system (OS) of the mobile endpoint device for application authentication, e.g., via an application programming interface (API) call. For example, the OS may then make an entitlement request to the MNO for an application (app) token. In accordance with the present disclosure the entitlement request may utilize SIM-based EAP-AKA, or the like, to validate the user (e.g., the mobile endpoint device and/or the user thereof). When the user/mobile endpoint device is entitled to access the application, the MNO may then provide an authorization indicator, e.g., a token, via a SIM-based EAP-AKA entitlement response to the mobile endpoint device OS. The OS may then inform the application, e.g., via the API, that the mobile endpoint device has been authenticated. The application (client) is thereby enabled to complete the sign-in process with the application host server(s), with the trust of MFA via the username/password and the authorization indicator, e.g., the app token, from the MNO.

To further illustrate, an example of secondary authentication/MFA for application access via a SIM-based authentication message exchange with the MNO may include the following. (1) A user may enter a username and password via an application client (app) operating on the mobile endpoint device. (2) The app may request an authorization indicator, e.g., an "app token," via an OS API. In one example, the app can optionally prompt/require the user to provide additional user information, such as: billing zip code, address, last name, etc. as an additional means of authentication. In one example, as a precondition, the application platform may possess a phone number associated with a user account of the user. The application platform may pass this phone number to the app client for performing the authentication for that particular phone number. The app client may then include this phone number in the request to the OS via the API. (3) The OS may transmit an entitlement request to the MNO to obtain a short-life "app token." The entitlement request may include the phone number obtained from the application platform and may further include one or more additional items of user information (e.g., billing zip code, etc., that may be obtained from the user). (4) The MNO may generate the "app token" after performing an entitlement check in accordance with EAP-AKA, or the like, and any additional checks, such as billing zip code verification. In one example, the app token is short-lived, and based on the user's mobile device entitlement, the app token is highly secure and difficult for attackers to intercept or replicate. (5) The MNO delivers the "app token" to the mobile endpoint device OS. (6) The OS provides a trusted "approve" to the app (e.g., via OS API, and based on the received "app token"). (7) The app may then complete user authentication, e.g., by completing a log-in and accessing protected network-based resources of the application platform, by engaging in additional messaging with the application platform for additional authentication/verification, such as obtaining and transmitting user responses to challenge questions (e.g., mother's maiden name, father's middle name, name of favorite sports team, etc.).

Notably, the authentication may use the EAP-AKA protocol to authenticate the user's mobile endpoint device with the MNO's infrastructure. Once the user's mobile device is authenticated, the short-life token (app token) is used for the app MFA process. In one example, the app token may be valid for a limited time, e.g., 10-30 seconds, or the like, after which it expires and cannot be used again. This provides an additional layer of security and helps to prevent unauthorized access to sensitive information.

Thus, examples of the present disclosure provide MFA via a SIM-based mobile endpoint device entitlement exchange, including the provisioning of an app token that is highly secure and difficult for attackers to bypass. Because the token is generated by the MNO's infrastructure and is based on the user's mobile endpoint device entitlement, it may be difficult for attackers to intercept or replicate the token. This can further be enhanced by additional user inputs for validation, such as zip code, billing address, account name, and others. Users do not need to install any additional software on their mobile endpoint devices to use the authentication methods of the present disclosure, since the functionality is provided via the mobile endpoint device OS. Additionally, because the app makes the request to the mobile endpoint device OS and the MNO is responsible for validating and generating the app token, there is no need for businesses or organizations to manage the authentication process themselves, e.g., via 3rd party SMS-based solutions. On the other hand, examples of the present disclosure may be easily incorporated into a mobile app by configuring the app to make calls directly to the mobile device OS for an app entitlement check via a SIM-based authentication message exchange with the MNO. These and other aspects of the present disclosure are discussed in greater detail below in connection with the examples of FIGS. 1-5.

FIG. 1 illustrates an example network, or system 100 in which examples of the present disclosure may operate. In one example, the system 100 includes a communication service provider network 101. The communication service provider network 101 may comprise a cellular network 110 (e.g., a 5G network, a 4G/Long Term Evolution (LTE)/5G hybrid network, or the like), a service network 140, and an IP Multimedia Subsystem (IMS) network 150. The system 100 may further include other networks 180 connected to the communication service provider network 101.

In one example, the cellular network 110 comprises an access network 120 and a cellular core network 130. In one example, the access network 120 comprises a cloud RAN. For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs) or radio units (RUs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126. In one example, baseband unit functionality may be split into a centralized unit (CU) and a distributed unit (DU). In addition, the CU and the DU may be physically separate from one another. For instance, a DU may be situated with an RU/RRH at a cell site, while a CU may be in a centralized location hosting multiple CUs. Alternatively, or in addition, a single CU may serve multiple DUs and/or RUs/RRHs. In accordance with the present disclosure a "base station" may therefore comprise at least a BBU (e.g., in one example, a CU and/or a DU), and may further include at least one RRH/RU. In accordance with the present disclosure, any one or more of cell sites 121-123 may be deployed with antenna and radio infrastructures, including multiple input multiple output (MIMO) and millimeter wave antennas.

In one example, access network 120 may include both 4G/LTE and 5G/NR radio access network infrastructures. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 5G network components, 3G network components, etc. Thus, cellular core network 130 may comprise an integrated network, e.g., including any two or more of 2G-5G infrastructures and technologies, and the like. For example, as illustrated in FIG. 1, cellular core network 130 further comprises 5G components, including: an access and mobility management function (AMF) 135, a network slice selection function (NSSF) 136, a session management function (SMF), a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, and so forth.

In one example, SMF 137 may perform endpoint device IP address management, UPF selection, UPF configuration for endpoint device traffic routing to an external packet data network (PDN), charging data collection, quality of service (QOS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

In one example, a UDR may include data regarding each user/subscriber account, such as user identity information, endpoint device information, and so forth, such as: SIM card identifier (e.g., an integrated circuit card identifier (ICCID)), the registered equipment identifier (e.g., an international mobile equipment identity (IMEI)), the subscriber identifier (e.g., an international mobile subscriber identity (IMSI)), and the telephone number (e.g., a mobile station international subscriber directory number (MSISDN)). The UDR may also store data regarding user, account, and/or device entitlement to certain network services, such as Wi-Fi calling, enhanced spam filtering, international roaming, dedicated slice access (e.g., for first responder accounts, governmental accounts, etc.), information regarding whether the account and/or one or more devices associated with an account have exceeded any usage allowances (e.g., 50 GB of monthly premium data, after which a device may be subject to reduced speeds during time of congestion, etc.), and so forth. In accordance with the present disclosure the UDR may further optionally store information regarding the entitlement of a user, account, and/or device to access one or more third-party services, e.g., one or more application platforms associated with server(s) 185. Accordingly, this information may be used for SIM-based MNO entitlement requests for the respective applications/application platforms, as described herein.

Authentication server function (AUSF) 195 may authenticate UEs (e.g., in response to requests from AMF 135), and may use backend services of the UDM 138 for authentication data, keys, etc. In this regard, AMF 135 may include/comprise a security anchor function (SEAF) that may pass UE authentication requests to AUSF 195. In one example, AUSF 195 may comprise all or a portion of a computing system, such as computing system 500 depicted in FIG. 5, and may be configured to perform steps, functions, and/or operations for transmitting an authorization indicator to a cellular endpoint device in accordance with a subscriber identity module-based authentication message exchange in response to determining an entitlement of the cellular endpoint device to access a third party application platform associated with an application, e.g., in accordance with the example method 300 of FIG. 3 and/or as described elsewhere herein.

Figure 5:
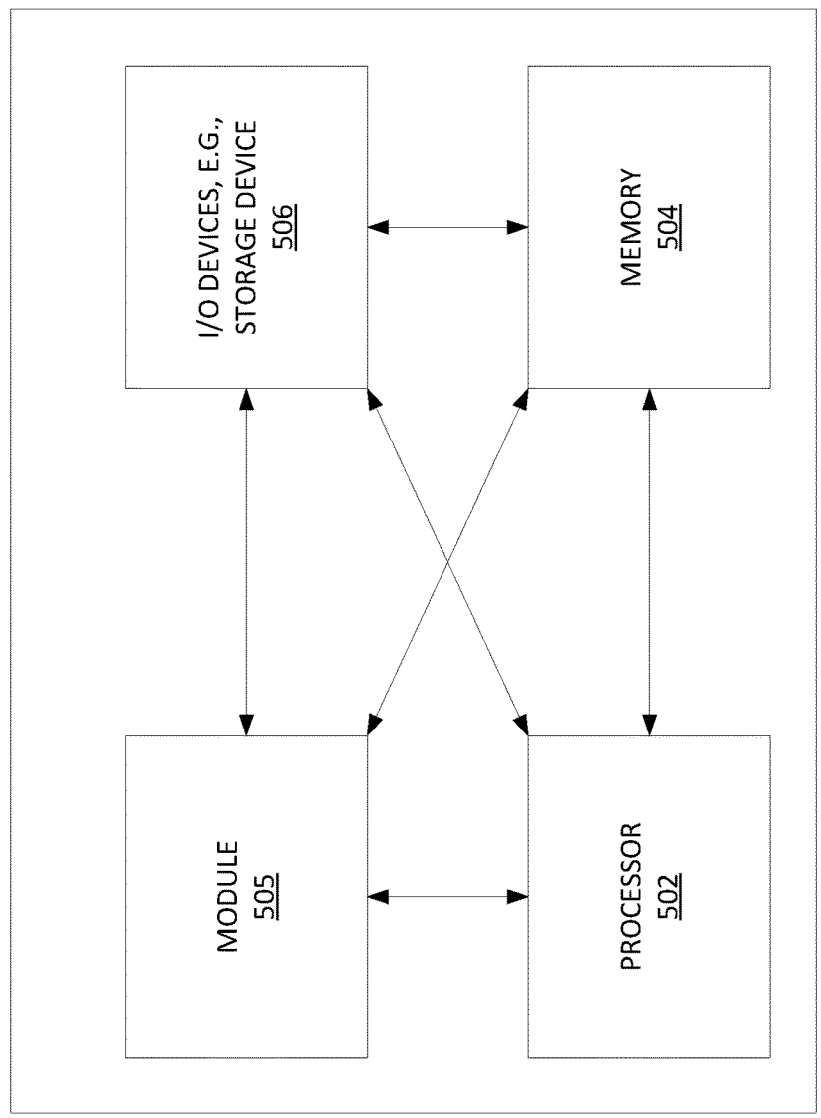
FIG. 5 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure may also relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and or users. For example, communication service provider network 101 may provide a cloud storage service, web server hosting, and other services. As such, service network 140 may represent aspects of communication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In accordance with the present disclosure, server(s) 185 may comprise one or more servers of one or more application service providers (broadly "third party application providers). In one example, server(s) 185 may comprise one or more application platforms for providing one or more network-based services to client applications. In one example, the client applications may specifically comprise applications for cellular endpoint devices. In particular, the application service providers may utilize SIM-based MNO entitlement requests for MFA, as described herein. In other words, the client applications may be configured/programmed to invoke a mobile endpoint device OS to initiate SIM-based MNO entitlement requests for the respective applications. In one example, server(s) 185 may individually or collectively comprise all or a portion of a computing system, such as computing system 500 depicted in FIG. 5, and may be configured to perform steps, functions, and/or operations for transmitting an instruction to an application to initiate an entitlement request to a cellular network in accordance with a subscriber identity module-based authentication message exchange, e.g., in accordance with the example method 400 of FIG. 4 and/or as described elsewhere herein.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, AUSF 195, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1.

In this regard, the cellular core network 130 may also include a self-optimizing network (SON) orchestrator 190 that may be responsible for activating and deactivating, allocating and deallocating, and otherwise managing a variety of network components. For instance, SON orchestrator 190 may activate and deactivate antennas/remote radio heads of cell sites 121 and 122, respectively, may steer antennas/remote radio heads of cell sites 121 and 122 (e.g., adjusting vertical tilt angles, azimuth bearings, beamwidths, power levels, and or other settings), may allocate or deallocate (or activate or deactivate) baseband units in BBU pool 126, may add (or remove) one or more network slices, and may perform other operations for adjusting configurations of components of cellular network 110. Accordingly, the SON orchestrator 190 may be connected directly or indirectly to any one or more network elements of cellular core network 130, and of the system 100 in general. Due to the relatively large number of connections available between SON orchestrator 190 and other network elements, none of the actual links to the SON orchestrator 190 are shown in FIG. 1. Similarly, intermediate devices and links between MME 131, SGW 132, cell sites 121-124, PGW 134, AMF 135, NSSF 136, SMF 137, UDM 138, AUSF 195, and/or UPF 139, and other components of system 100 are also omitted for clarity, such as additional routers, switches, gateways, and the like.

FIG. 1 also illustrates various endpoint devices, e.g., user equipment (UE) 104 and 106. UEs 104 and 106 may each comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In one example, each of the UEs 104 and UE 106 may include an operating system (OS) (e.g., a "mobile OS" or "mobile endpoint device OS"), e.g., loaded into a memory and in operation thereon via one or more processors. In addition, each of UEs 104 and 106 may include one or more applications (apps) installed and in operation thereon. Each of the UEs 104 and 106 may further include a SIM. The SIM may be a SIM card (e.g., a universal integrated circuit card (UICC)), or an eSIM that may storage an international mobile subscriber identity (IMSI) number, one or more authentication keys for authenticating the SIM to a cellular/mobile network, etc. In one example, either or both of UEs 104 and 106 may comprise dual SIM devices. The SIM(s) may store an ICCID, IMSI, MSISDN, authentication key(s), user services (e.g., value-added services), local network information, personal identification number (PIN), unblocking code, and so forth.

As described above, one or more of the apps may be configured/programmed to invoke the OS of a respective host device (e.g., UE 104 or UE 106, etc.) to initiate SIM-based MNO entitlement requests for the respective app(s). Similarly, the operating systems of UEs 104 and 106 may be configured to invoke a respective SIM/eSIM to initiate and engage in a SIM-based authentication message exchange (e.g., via AMF 135) for additional app authentication in accordance with the present disclosure. In this regard, each of the UEs 104 and 106 may comprise all or a portion of a computing system, such as computing system 500 depicted in FIG. 5, and may be configured to perform steps, functions, and/or operations for an operating system of a cellular endpoint device to provide an authentication confirmation to an application in response to an authorization indicator obtained from a cellular network in accordance with a subscriber identity module-based authentication message exchange, e.g., in accordance with the example method 200 of FIG. 2 and/or as described elsewhere herein.

As illustrated in FIG. 1, UE 104 may access wireless services via the cell site 121 (e.g., NR alone, where cell site 121 comprises a gNB), while UE 106 may access wireless services via any of the cell sites 121-124 located in the access network 120 (e.g., for NR non-dual connectivity, for LTE non-dual connectivity, for NR-NR dual connectivity (DC), for LTE-LTE DC, for EN-DC, and/or for NE-DC). For instance, in one example, UE 106 may establish and maintain connections to the cellular core network 130 via multiple gNBs (e.g., cell sites 121 and 122 and/or cell sites 121 and 122 in conjunction with BBU pool 126 and/or various other components, such as a CU and/or a DU). In another example, UE 106 may establish and maintain connections to the cellular core network 130 via a gNB (e.g., cell site 122 and/or cell site 122 in conjunction with BBU pool 126) and a eNodeB (e.g., cell site 124), respectively. In addition, either the gNB or the eNodeB may comprise a PCell, and the other may comprise a SCell for dual connectivity. Similarly, UE 106 may communicate with any of the cell sites 121 and 122 using carrier aggregation (CA) (e.g., in accordance with a CA technique). Furthermore, either or both of NR/5G and or EPC (4G/LTE) core network components may manage the communications between UE 106 and the cellular network 110) via cell site 122 and cell site 124.

In one example, UE 106 may be authenticated with cellular network 110, e.g., via an EAP-AKA message exchange and may establish a data session with one or more of server(s) 185 via UPF 139, e.g., to access an application platform, such as accessing an online banking service, a social media service, etc. A user may be prompted to enter a username and password via a client application on device 106, which may be passed to the server(s) 185. Optionally, the user may be prompted to provide additional identification information, such as a billing zip code, etc. Server(s) 185 may confirm that the username and password are a correct match to a user account and may then respond to the client application in the affirmative. Optionally, server(s) 185 may verify one or more items of additional identification information that is/are entered by the user. In one example, a positive response to the client application may further include a phone number associated with the user account/user profile (e.g., a hashed version of the phone number that is not accessible to the user, or the like).

As described above, the client application may be configured to submit an authentication request to the mobile OS in response to an instruction from the application platform (e.g., a positive response indicating the username/password combination (and any other verification items) is/are correct). In one example, the client application may include the phone number obtained from the application platform in the request. In another example, the OS may prompt the client application to provide the phone number in response to receiving the authentication request.

In one example, the mobile OS may validate the received phone number against the phone number stored on the SIM. If there is a mismatch, the OS may halt the SIM-based MNO entitlement request. In other words, the secondary app authentication may fail. Otherwise, the mobile OS may transmit an entitlement request to the cellular network 110 in accordance with a SIM-based authentication message exchange, e.g., the mobile OS may invoke the SIM/eSIM of UE 106 to initiate and engage in a SIM-based authentication message exchange (e.g., via AMF 135). Cellular network 110 may then authenticate the UE 106 for allowing (or denying) access to the application platform (e.g., server(s) 185). For example, UE 106 and the cellular network 110 may participate in an EAP-AKA message exchange process. To illustrate, AMF 135 may obtain the entitlement request from UE 106 and may transmit a further request to AUSF 195. For instance, AMF 135 may perform such operations in accordance with its SEAF functionality. The AUSF 195 may transmit a further request to the UDM 138. UDM 138 may then access a UDR or the like to determine whether UE 106 is entitled to access the requested application platform. In one example, this may further include verifying additional information items, such as billing zip code, or the like, which may be obtained from the user and passed via the requests (e.g., from the UE OS to the AMF 135 via the SIM, from the AMF 135 to AUSF 195 and through to the UDM 138). If false, the UDM 138 may cause the secondary authentication to fail.

Otherwise, UDM 138 may respond to AUSF 195 with an authentication indicator (i.e., a positive authentication indicator). AUSF 195 may pass the authentication indicator to the AMF 135 (e.g., in accordance with a SEAF component of the AMF 135), which may further return the authentication indicator to the SIM and/or mobile OS of UE 106. The OS, in turn may provide the authentication indicator to the application, and may grant the application client continued access to the data session with server(s) 185. As such, the application client may complete a log-in process, e.g., to access an online banking service, a social media service, etc.

In one example, the authentication indicator may comprise an authentication token that is provided by UDM 139 to AUSF 195, e.g., along with an expected response token. In one example, AUSF 195 may then generate a hash of an expected response token and pass the authentication token and hash of the expected response to AMF 135 (e.g., in accordance with a SEAF component of AMF 135). The authentication token may be returned to the SIM and/or mobile OS of UE 106. For example, the SIM may verify that the authentication token is correct using a stored network key, and may generate and transmit a response token to the cellular network (e.g., to AMF 135). AMF 135 may pass the response token to AUSF 195, which may verify that the response token matches the expected response token. If correct, the AUSF 195 may notify AMF 135 and UDM 138 of success. Notably, if there is a failure, AUSF 195 may notify AMF 135, which may then proceed to inform the OS of UE 106. Alternatively, or in addition, AMF 135 may cause a cell site to terminate any data bearers allocated to the UE 106 and/or for the specific session with the application platform (server(s) 185) via UPF 139, and so forth.

Upon receiving the authentication token and verifying that it is a legitimate token from cellular network 110, the SIM may pass to the OS, which in turn may grant the application client continued access to the data session with server(s) 185. As such, the application client may complete a log-in process, e.g., to access a financial service, e.g., an online banking service, a social media service, etc. For instance, the client application may obtain full access following the receipt of the authentication token. Alternatively, the user may be prompted to complete one or more additional challenge questions, or other additional authentication factors may be called up for the user. For instance, examples of the present disclosure may include a further SMS-based tertiary authentication, or the like.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), a network repository function (NRF), and other application functions (AFs). In one example, any one or more of cell sites 121-123 may comprise 2G, 3G, 4G and/or LTE radios, e.g., in addition to 5G new radio (NR), or gNB functionality. For instance, cell site 123 is illustrated as being in communication with AMF 135 in addition to MME 131 and SGW 132.

It should be noted that although examples herein describe cellular endpoint devices having subscriber identity modules, in other, further and different embodiments, examples of the present disclosure may implement one or more other components or devices providing the same or substantially similar functions as a subscriber identity module. For instance, examples of the present disclosure may employ any integrated circuit or other devices that may perform typical SIM card related functions (e.g., storage of an international mobile subscriber identity (IMSI) number, storage of an authentication key for authenticating the SIM to a mobile network, etc.) and that is at least capable of performing the functions mentioned herein which are described as being performed by a SIM card. In addition, it should be noted that examples of the present disclosure are described herein primarily in connection with steps, functions, and/or operations that are performed by AUSF 195. However, in other, further, and different examples, various steps, functions, and/or operations as described in connection with FIG. 2, or as described elsewhere herein, may alternatively or additionally be performed by one or more other components. For instance, various steps, functions, and/or operations may alternatively or additionally be performed by AMF 135, UDM 138, or the like, or a dedicated server.

In addition, although examples are described herein primarily in connection with 5G network components, other, further, and different examples may similarly relate to 4G/LTE network components, or the like. For instance, in one example the SIM-based authentication message exchange of the present disclosure may be in accordance with EAP-AKA. However, other examples may utilize EAP-AKA-prime (EAP-AKA'), EAP-transport layer security (EAP-TLS), evolved packet system (EPS)-AKA, and so forth. In this regard, it should also be noted that the SIM-based authentication message exchange of the present disclosure may similarly occur via a non-cellular/non-3GPP network access (e.g., a Wi-Fi network). For instance, UE 106 may engage in a SIM-based authentication message exchange with AMF 135 and AUSF 195 via an N3IWF (non-3GPP inter-working function). Thus, these and other modifications are all contemplated within the scope of the present disclosure.

Figure 2:
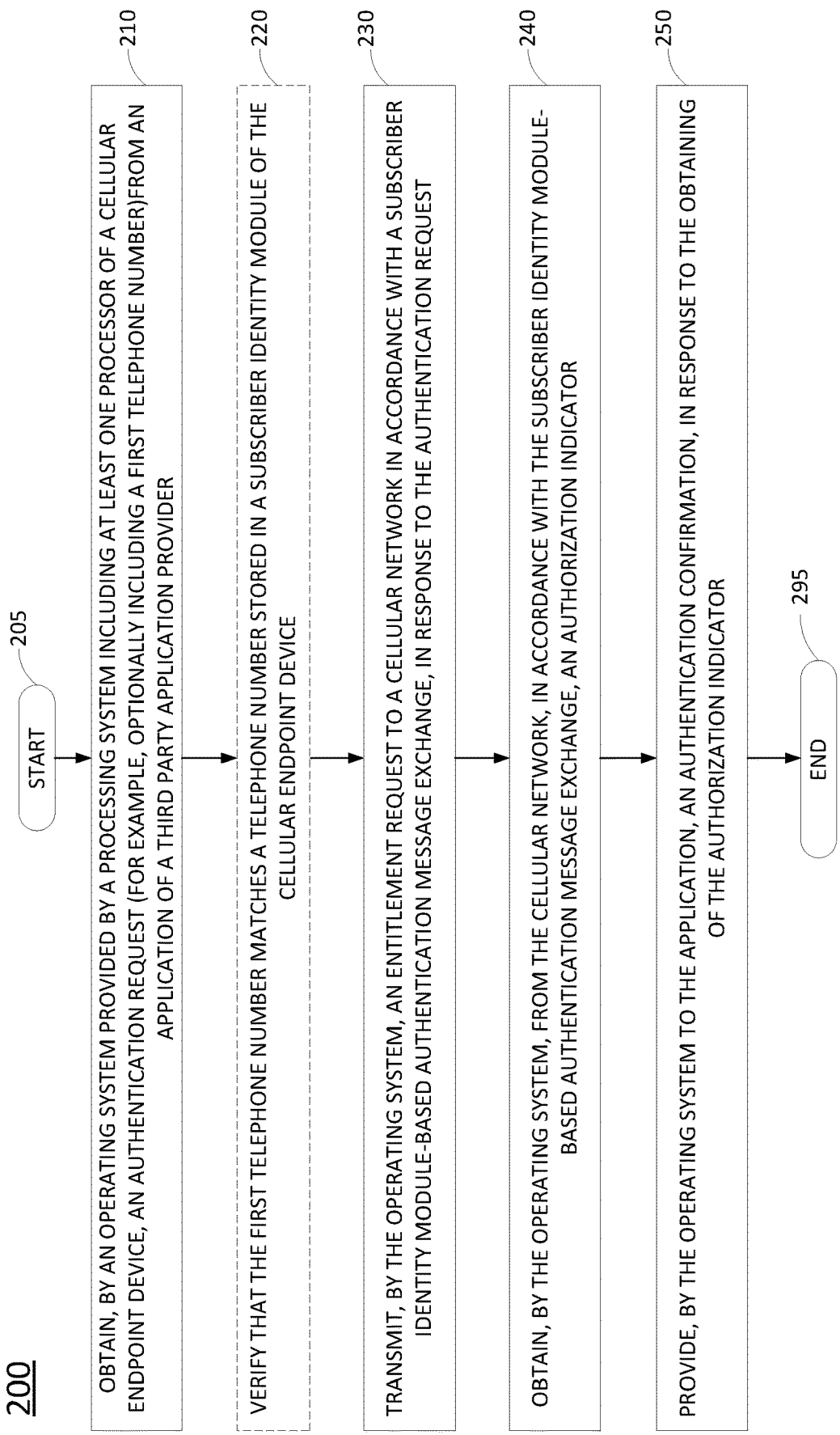
FIG. 2 illustrates a flowchart of an example method for an operating system of a cellular endpoint device to provide an authentication confirmation to an application in response to an authorization indicator obtained from a cellular network in accordance with a subscriber identity module-based authentication message exchange.

FIG. 2 illustrates a flowchart of an example method 200 for an operating system of a cellular endpoint device to provide an authentication confirmation to an application in response to an authorization indicator obtained from a cellular network in accordance with a subscriber identity module-based authentication message exchange, in accordance with the present disclosure. In one example, steps, functions and/or operations of the method 200 may be performed by a device as illustrated in FIG. 1, e.g., UE 104 or UE 106, or any one or more components thereof, such as a processing system (e.g., having an operating system and at least one application installed and in operation thereon) or collectively via a plurality devices in FIG. 1, such as UE 104 or UE 106 in conjunction with an AMF 135, one of cell sites 121-124, and so forth. In one example, the steps, functions, or operations of method 200 may be performed by a computing device or system 500, and/or a processing system 502 as described in connection with FIG. 5 below. Similarly, in one example, the steps, functions, or operations of method 200 may be performed by a processing system comprising one or more computing devices collectively configured to perform various steps, functions, and/or operations of the method 200. For instance, multiple instances of the computing device or processing system 500 may collectively function as a processing system. For illustrative purposes, the method 200 is described in greater detail below in connection with an example performed by a processing system, such as processing system 502. The method 200 begins in step 205 and proceeds to step 210.

At step 210, an operating system provided by a processing system including at least one processor of a cellular endpoint device obtains an authentication request from an application of a third party application provider that is in operation on the cellular endpoint device. For instance, the application may make the authentication request in response to a request from the cellular endpoint device to access an application platform in accordance with a user account. For example, the application may first connect to the application platform, or an external security domain associated with the application platform, where the user may provide a username and password, or the like, in order to commence a log-in process. As noted above, in one example, upon the application platform confirming a correct username/password combination, the application platform may instruct or permit the application to initiate a secondary authentication using the SIM-based authentication message exchange with the cellular network/MNO. In one example, the authentication request may include a first telephone number associated with a user account associated with the application (e.g., a telephone number stored for an online banking account, a social media account, an account with a merchant website, etc.). For example, the third party may maintain the first telephone number as part of the user account and may use the first telephone number to communicate with the user. In one example, the telephone number in the authentication request may be obtained by the application from the application platform of the third party application provider in response to a request from the cellular endpoint device to access the application platform in accordance with the user account. Notably, the first telephone number is not entered by the user via the application, nor is the first telephone number obtained from the cellular endpoint device itself. In one example, the first telephone number may be obtained in the request in a hashed format or the like, such that the first telephone number is not accessible to the user. In one example, the authentication request may further include at least one user identify feature value that may be obtained from the user via the application, such as a billing zip code, a last name, an answer to security question, or the like.

At optional step 220, the operating system may verify that the first telephone number matches a telephone number stored in a subscriber identity module (SIM) of the cellular endpoint device. For instance, optional step 220 may comprise a first pass/fail point of the secondary authentication that has been requested by the application. For example, if a malicious actor attempts to login using the user's credentials, but on a cellular endpoint device that is not associated with the first telephone number, the OS may detect a problem when there is a mismatch with the telephone number stored on the SIM of the cellular endpoint device. For example, when the first telephone number does not match the telephone number stored in the SIM, the OS/SIM may cause the transaction to fail at that point. However, if there is a match, the method 200 may proceed to step 230.

At step 230, the operating system may transmit an entitlement request to a cellular network in accordance with a subscriber identity module (SIM)-based authentication message exchange, in response to the authentication request. In one example, the transmitting of the entitlement request may be further in response to a positive verification at optional step 220. For instance, the SIM-based authentication message exchange may comprise an extensible authentication protocol (EAP) message exchange. To further illustrate, the EAP message exchange may comprise one of: an EAP-SIM message exchange, an EAP-AKA message exchange, an EAP-AKA' message exchange, an EAP-TLS message exchange, an EPS-AKA message exchange, or the like. In one example, the entitlement request may be initiated by transmitting an EAP-AKA authentication request, or the like, to an access management function (AMF) of the cellular network (e.g., via a gNB, eNodeB, or the like, or via a non-cellular access, e.g., via an N3IWF, etc.) (or similarly via an MME or the like in a 4G/LTE example). In one example, the entitlement request may include the first telephone number (e.g., for further verification in the cellular network). Alternatively, or in addition, in one example, the entitlement request may include at least one user identity feature value. For instance, the operating system may obtain the at least one user identity feature value from the user via the application and may then include the at least one user identity feature value in the entitlement request.

At step 240, the operating system obtains an authorization indicator from the cellular network, in accordance with the SIM-based authentication message exchange. For instance, in one example, the authorization indicator may be obtained from an AMF of the cellular network (e.g., via a gNB or the like). In one example, the authorization indicator may comprise an authorization token (or "authentication token").

At step 250, the operating system provides an authentication confirmation to the application, in response to the obtaining of the authorization indicator. For instance, the authentication confirmation may enable the application operating on the cellular endpoint device to access a third party application platform associated with the application (e.g., to continue a login process, or the like, to gain access to account information, etc.).

Following step 250, the method 200 may proceed to step 295 where the method 200 ends.

It should be noted that the method 200 may be expanded to include additional steps or may be modified to include additional operations or omit operations with respect to the steps outlined above. For example, the method 200 may be repeated through various cycles of accessing the same third-party application platform, or one or more other third-party application platforms, by the same or other application(s) installed and in operation on the cellular endpoint device. In one example, the method 200 may further include verifying the authorization indicator (e.g., an authorization token) in accordance with a hash function of the SIM (e.g., using a stored authentication key). In one example, the providing of the authentication confirmation may be further in response to the verifying of the authorization token. In one example, the application may provide the first telephone number in one or more initial messages of the request. Alternatively, or in addition, in one example, the OS may request the telephone number from the application after receiving the request (and similarly for the at least one user identity feature value). In one example, the method 200 may further include transmitting data from the cellular endpoint device to the application platform using the authorization token, another key derived from the authorization token, or the like. For instance, the cellular network may be configured to reject data plane communications from the cellular endpoint device to the application platform (e.g., for a data bearer assigned to the session) that are not sent with the token, or key. In one example, the method 200 may be expanded or modified to include steps, functions, and/or operations, or other features described in connection with the example(s) of FIGS. 1, 3, and/or 4 or as described elsewhere herein. Thus, these and other modifications are all contemplated within the scope of the present disclosure.

Figure 3:
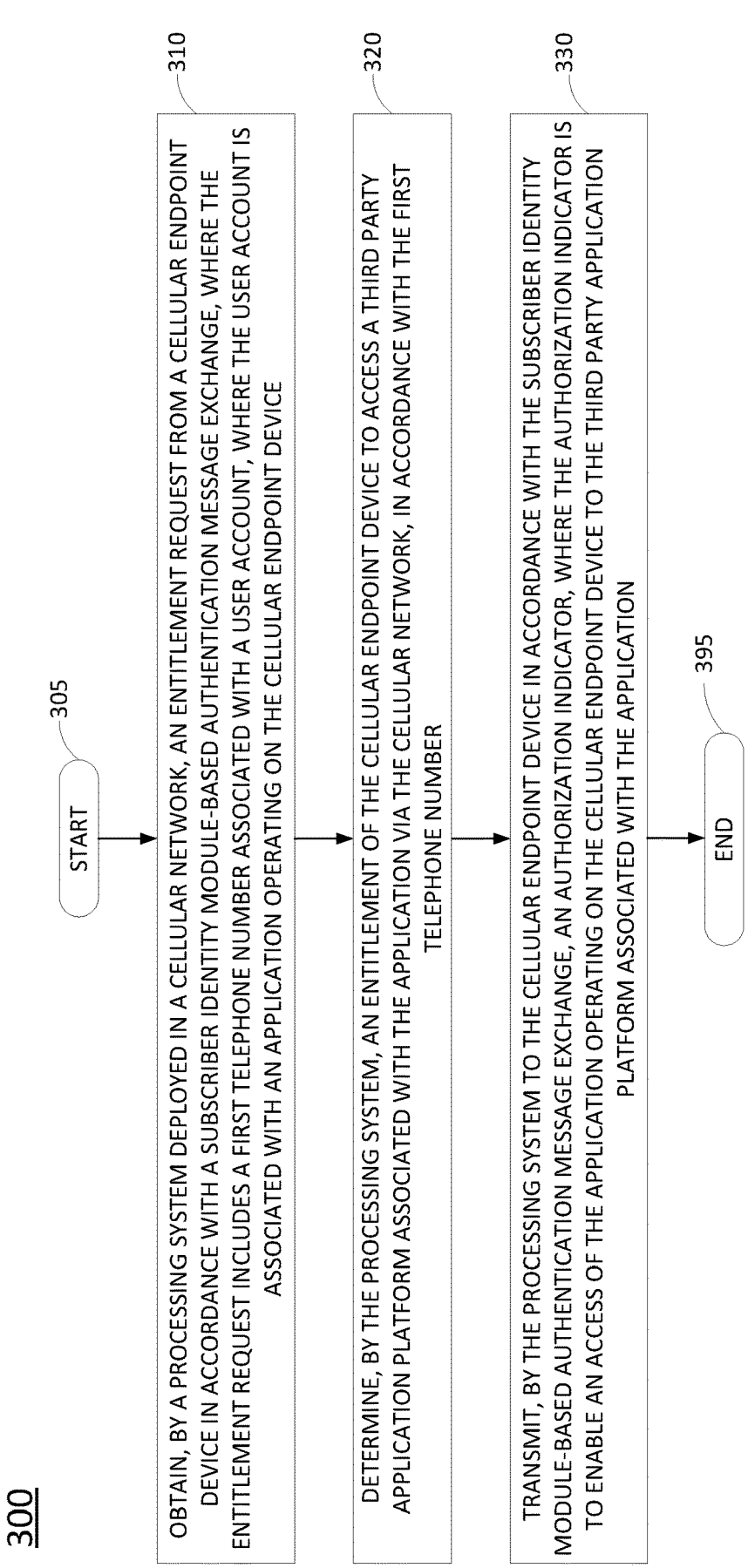
FIG. 3 illustrates a flowchart of an example method for transmitting an authorization indicator to a cellular endpoint device in accordance with a subscriber identity module-based authentication message exchange in response to determining an entitlement of the cellular endpoint device to access a third party application platform associated with an application.

FIG. 3 illustrates a flowchart of an example method 300 for transmitting an authorization indicator to a cellular endpoint device in accordance with a subscriber identity module-based authentication message exchange in response to determining an entitlement of the cellular endpoint device to access a third party application platform associated with an application, in accordance with the present disclosure. In one example, steps, functions and/or operations of the method 300 may be performed by a device as illustrated in FIG. 1, e.g., AUSF 195, AMF 135, and/or UDM 138, or any one or more components thereof, such as a processing system, or collectively via a plurality devices in FIG. 1, such as any one or more of AUSF 195, AMF 135, and/or UDM 138, in conjunction with one another and/or in conjunction with one or more other devices, such as a base station (e.g., a gNB), a UDR, and so forth. In one example, the steps, functions, or operations of method 300 may be performed by a computing device or system 500, and/or a processing system 502 as described in connection with FIG. 5 below. Similarly, in one example, the steps, functions, or operations of method 300 may be performed by a processing system comprising one or more computing devices collectively configured to perform various steps, functions, and/or operations of the method 300. For instance, multiple instances of the computing device or processing system 500 may collectively function as a processing system. For illustrative purposes, the method 300 is described in greater detail below in connection with an example performed by a processing system, such as processing system 502. The method 300 begins in step 305 and proceeds to step 310.

At step 310, the processing system (e.g., a processing system deployed in a cellular network) obtains an entitlement request from a cellular endpoint device in accordance with a subscriber identity module (SIM)-based authentication message exchange. In one example, the entitlement request may include a first telephone number associated with a user account, where the user account is associated with an application operating on the cellular endpoint device. In one example, the entitlement request may further include at least one user identity feature value (e.g., a billing zip code, an answer to a security question, etc.). For instance, an operating system of the cellular endpoint device may obtain the at least one user identity feature value, and may then include the at least one user identity feature value in the entitlement request transmitted to the cellular network via the SIM. For example, the entitlement request may be generated by the operating system in response to an authentication request from the application. The SIM based authentication message exchange may comprise an EAP message exchange, such as: an EAP-SIM message exchange, an EAP-AKA message exchange, an EAP-AKA' message exchange, an EAP-TLS message exchange, an EPS-AKA message exchange or the like. The processing system may comprise at least one of: an access management function (AMF), a security anchor function (SEAF), an authentication server function (AUSF), or a uniform data management (UDM) function. In one example, the entitlement request may be received via a cellular base station (e.g., a gNB, eNodeB, or the like). In another example, the entitlement request may be received via a non-cellular access (e.g., via internet facing entitlement, an N3IWF, or the like).

At step 320, the processing system determines an entitlement of the cellular endpoint device to access a third party application platform associated with the application, in accordance with the first telephone number. For example, the determining may comprise verifying at least the first telephone number against a stored telephone number in a unified data repository (UDR) of the cellular network. For example, the processing system may determine that the user and/or the cellular endpoint device may be authenticated when the phone number and other SIM information match record(s) in the UDR. In one example, the determining of the entitlement may be further in accordance with at least one user identity feature value that may be obtained with the entitlement request. For example, the processing system may verify the at least one user identity feature value against at least one corresponding stored value in the UDR. In one example, the entitlement request may include an identification of the application and/or application platform, where the UDR may store indicators of entitlement of the user and/or cellular endpoint device to access the one or more application platforms via the respective applications. In one example, the permitted application(s) may be indicated to the cellular network by the user and/or another user associated with the account, by the third party application provider, or the like.

At step 330, the processing system transmits an authorization indicator to the cellular endpoint device in accordance with the SIM-based authentication message exchange, where the authorization indicator is to enable an access of the application operating on the cellular endpoint device to the third party application platform associated with the application (e.g., one or more servers of an online banking service, a social media service, an online merchant site, etc.). In one example, the authorization indicator may comprise an authentication token, as described above. In one embodiment, the processing system may transmit an authorization indicator to the cellular endpoint device in accordance with the SIM-based authentication message exchange without knowing the purpose of the request. In other words, in one embodiment, the processing system may transmit an authorization indicator to the cellular endpoint device in accordance with the SIM-based authentication message exchange for authenticating the user endpoint device to access the services of the cellular network itself and not for accessing the services of a third party application platform. Said another way, the SIM-based authentication message exchange is simply performed to authenticate the user endpoint device and the cellular network may not be aware that the user endpoint device is using the SIM-based authentication message exchange for the specific purpose of accessing one or more services of a third party application platform.

Following step 330, the method 300 may proceed to step 395 where the method 300 ends.

It should be noted that the method 300 may be expanded to include additional steps or may be modified to include additional operations or omit operations with respect to the steps outlined above. For example, the method 300 may be repeated through various cycles of attempts to access the same third-party application platform, or one or more other third-party application platforms, by the same or other application(s) installed and in operation on the cellular endpoint device. In one example, the method 300 may include transmitting a failure message, e.g., when information received in the entitlement request does not match one or more stored values/expected values in the UDR, or the like. In one example, the method 300 may be expanded or modified to include steps, functions, and/or operations, or other features described in connection with the example(s) of FIGS. 1, 2, and/or 4, or as described elsewhere herein. Thus, these and other modifications are all contemplated within the scope of the present disclosure.

Figure 4:
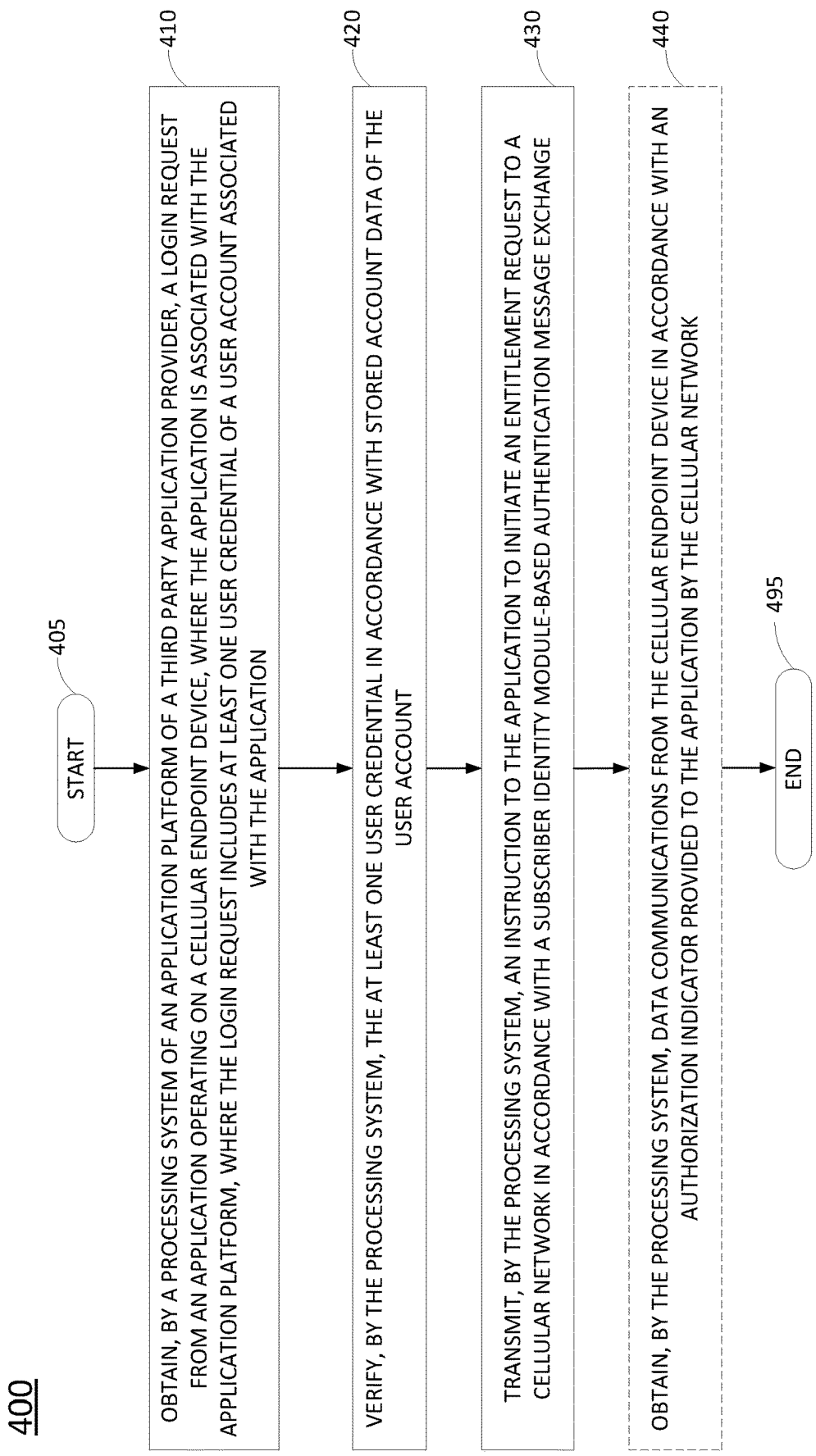
FIG. 4 illustrates a flowchart of an example method for transmitting an instruction to an application to initiate an entitlement request to a cellular network in accordance with a subscriber identity module-based authentication message exchange.

FIG. 4 illustrates a flowchart of an example method 400 for transmitting an instruction to an application to initiate an entitlement request to a cellular network in accordance with a subscriber identity module-based authentication message exchange, in accordance with the present disclosure. In one example, steps, functions and/or operations of the method 400 may be performed by a device as illustrated in FIG. 1, e.g., one of server(s) 185, or any one or more components thereof, such as a processing system, or collectively via a plurality devices in FIG. 1, such as any one or more of server(s) 185, in conjunction with one another and/or in conjunction with one or more other devices, such as a cellular endpoint device, and so forth. In one example, the steps, functions, or operations of method 400 may be performed by a computing device or system 500, and/or a processing system 502 as described in connection with FIG. 5 below. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system, such as processing system 502. The method 400 begins in step 405 and proceeds to step 410.

In step 410, the processing system (e.g., of an application platform of a third party application provider) obtains a login request from an application operating on a cellular endpoint device, where the application is associated with the application platform (e.g., the application is a client application). The login request may include at least one user credential of a user account associated with the application (e.g., a username, an account number or account identifier, a username and password combination, and so forth). In one example, the login request may include one or more items of additional user information, such as: billing zip code, address, last name, etc.

At step 420, the processing system may verify the at least one user credential in accordance with stored account data of the user account. For instance, the processing system may look-up a user account based on the username and determine that the provided password matches the stored password (or a hash of the password matches a stored, hashed password). In one example, one or more items of additional user information may also be confirmed to match (if provided in the login request at step 410).

At step 430, the processing system transmits an instruction to the application to initiate an entitlement request to a cellular network in accordance with a subscriber identity module-based authentication message exchange. In one embodiment, the instruction may include a phone number (e.g., a cellular phone number) to be authenticated via the subscriber identity module-based authentication message exchange. For instance, as described above, the application may be configured to generate an authentication request to an operating system of the cellular endpoint device in response to the instruction. In addition, the operating system may be configured to transmit the entitlement request in response to the authentication request (e.g., via the device SIM).

At optional step 440, the processing system may obtain data communications from the cellular endpoint device in accordance with an authorization indicator provided to the application by the cellular network (e.g., via the SIM and the OS, such as described above). In one example, the authorization indicator may be an authorization token, and the data communications may be in accordance with the authorization token, e.g., sent via the cellular network with the authorization token and/or encoded using the authorization token, or the like.

Following step 430 or optional step 440, the method 400 may proceed to step 495 where the method 400 ends.

It should be noted that the method 400 may be expanded to include additional steps or may be modified to include additional operations or omit operations with respect to the steps outlined above. For example, the method 400 may be repeated through various cycles of attempts to access the third-party application platform by the same or other application(s) installed and in operation on the cellular endpoint device or other cellular endpoint devices. In one example, the method 400 may include transmitting a failure message, e.g., when information received in the login request does not match one or more stored values/expected values in the user account, or the like. In one example, the method 400 may be expanded or modified to include steps, functions, and/or operations, or other features described in connection with the example(s) of FIGS. 1, 2, and/or 3, or as described elsewhere herein. Thus, these and other modifications are all contemplated within the scope of the present disclosure.

In addition, although not specifically specified, one or more steps, functions, or operations of the example methods 200-400 may include a storing, displaying, and/or outputting step as required for a particular application. In other words, any data, records, fields, and/or intermediate results discussed in the method(s) can be stored, displayed, and/or outputted either on the device executing the method or to another device, as required for a particular application. Furthermore, steps, blocks, functions or operations in FIGS. 2-4 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the examples of the present disclosure.

FIG. 5 depicts a high-level block diagram of a computing device or processing system specifically programmed to perform the functions described herein. For example, any one or more components or devices illustrated in FIG. 1, or described in connection with the example methods 200-400 of FIGS. 2-4, respectively, may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for an operating system of a cellular endpoint device to provide an authentication confirmation to an application in response to an authorization indicator obtained from a cellular network in accordance with a subscriber identity module-based authentication message exchange, for transmitting an authorization indicator to a cellular endpoint device in accordance with a subscriber identity module-based authentication message exchange in response to determining an entitlement of the cellular endpoint device to access a third party application platform associated with an application, or for transmitting an instruction to an application to initiate an entitlement request to a cellular network in accordance with a subscriber identity module-based authentication message exchange, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like). In accordance with the present disclosure input/output devices 506 may also include antenna elements, antenna arrays, remote radio heads (RRHs), baseband units (BBUs), transceivers, power units, and so forth.

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for an operating system of a cellular endpoint device to provide an authentication confirmation to an application in response to an authorization indicator obtained from a cellular network in accordance with a subscriber identity module-based authentication message exchange, for transmitting an authorization indicator to a cellular endpoint device in accordance with a subscriber identity module-based authentication message exchange in response to determining an entitlement of the cellular endpoint device to access a third party application platform associated with an application, or for transmitting an instruction to an application to initiate an entitlement request to a cellular network in accordance with a subscriber identity module-based authentication message exchange (e.g., a software program comprising computer-executable instructions) can be loaded into memory 504 and executed by hardware processor element 502 to implement the steps, functions or operations as discussed above in connection with the example methods 200-400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for an operating system of a cellular endpoint device to provide an authentication confirmation to an application in response to an authorization indicator obtained from a cellular network in accordance with a subscriber identity module-based authentication message exchange, for transmitting an authorization indicator to a cellular endpoint device in accordance with a subscriber identity module-based authentication message exchange in response to determining an entitlement of the cellular endpoint device to access a third party application platform associated with an application, or for transmitting an instruction to an application to initiate an entitlement request to a cellular network in accordance with a subscriber identity module-based authentication message exchange (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining, by an operating system provided by a processing system including at least one processor of a cellular endpoint device, an authentication request from an application of a third party application provider;
   transmitting, by the operating system, an entitlement request to a cellular network in accordance with a subscriber identity module-based authentication message exchange, in response to the authentication request;
   obtaining, by the operating system, from the cellular network, in accordance with the subscriber identity module-based authentication message exchange, an authorization indicator; and
   providing, by the operating system to the application, an authentication confirmation, in response to the obtaining of the authorization indicator.

2. The method of claim 1, wherein the authentication request includes a first telephone number associated with a user account associated with the application.

3. The method of claim 2, wherein the first telephone number is obtained by the application from an application platform of the third party application provider in response to a request from the cellular endpoint device to access the application platform in accordance with the user account.

4. The method of claim 2, further comprising:
verifying that the first telephone number matches a telephone number stored in a subscriber identity module of the cellular endpoint device, wherein the transmitting of the entitlement request is in response to the verifying.

5. The method of claim 2, wherein the entitlement request includes the first telephone number associated with the cellular endpoint device.

6. The method of claim 1, wherein the authentication request includes at least one user identity feature value.

7. The method of claim 6, wherein the entitlement request includes the at least one user identity feature value.

8. The method of claim 1, wherein the authentication indicator comprises an authentication token.

9. The method of claim 1, wherein the subscriber identity module-based authentication message exchange comprises an extensible authentication protocol message exchange.

10. The method of claim 9, wherein the extensible authentication protocol message exchange comprises:
an extensible authentication protocol-subscriber identity module message exchange;
an extensible authentication protocol-authentication and key agreement message exchange;
an extensible authentication protocol-authentication and key agreement-prime message exchange;
an extensible authentication protocol-transport layer security message exchange; or
an evolved packet system-authentication and key agreement message exchange.

11. The method of claim 1, wherein the entitlement request is transmitted to an access management function of the cellular network, and wherein the authorization indicator is obtained from the access management function.

12. A method comprising:
obtaining, by a processing system including at least one processor of an application platform of a third party application provider, a login request from an application operating on a cellular endpoint device, wherein the application is associated with the application platform, wherein the login request includes at least one user credential of a user account associated with the application;
verifying, by the processing system, the at least one user credential in accordance with stored account data of the user account; and
transmitting, by the processing system, an instruction to the application to initiate an entitlement request to a cellular network in accordance with a subscriber identity module-based authentication message exchange.

13. A method comprising:
obtaining, by a processing system deployed in a cellular network, an entitlement request from a cellular endpoint device in accordance with a subscriber identity module-based authentication message exchange, wherein the entitlement request includes a first telephone number associated with a user account, wherein the user account is associated with an application operating on the cellular endpoint device;
determining, by the processing system, an entitlement of the cellular endpoint device to access a third party application platform associated with the application via the cellular network, in accordance with the first telephone number; and
transmitting, by the processing system to the cellular endpoint device in accordance with the subscriber identity module-based authentication message exchange, an authorization indicator, wherein the authorization indicator is to enable an access of the application operating on the cellular endpoint device to the third party application platform associated with the application.

14. The method of claim 13, wherein the determining comprises verifying at least the first telephone number against a stored telephone number in a unified data repository of the cellular network.

15. The method of claim 13, wherein the entitlement request includes the at least one user identity feature value.

16. The method of claim 15, wherein the determining of the entitlement is further in accordance with the at least one user identity feature value.

17. The method of claim 13, wherein the subscriber identity module-based authentication message exchange comprises an extensible authentication protocol message exchange.

18. The method of claim 17, wherein the extensible authentication protocol message exchange comprises:
an extensible authentication protocol-subscriber identity module message exchange;
an extensible authentication protocol-authentication and key agreement message exchange;
an extensible authentication protocol-authentication and key agreement-prime message exchange;
an extensible authentication protocol-transport layer security message exchange; or
an evolved packet system-authentication and key agreement message exchange.

19. The method of claim 13, wherein the processing system comprises at least one of:
an access management function;
a security anchor function;
an authentication server function; or
a uniform data management function.

20. The method of claim 13, wherein the entitlement request is generated by an operating system of the cellular endpoint device in response to an authentication request from the application.

* * * * *